United States Patent
Akbulut et al.

(10) Patent No.: US 10,108,415 B2
(45) Date of Patent: *Oct. 23, 2018

(54) MAINTAINING THE INTEGRITY OF PROCESS CONVENTIONS WITHIN AN ALM FRAMEWORK

(71) Applicant: International Business Machines Corporation, Armonk, NY (US)

(72) Inventors: Muhtar B. Akbulut, Waban, MA (US); Mark T. Buquor, Concord, MA (US); Vivek Garg, Concord, MA (US); Matthew P. Jarvis, Burlington, MA (US); David Liman, Ontario, CA (US); Nimit K. Patel, Framingham, MA (US); Scott R. Patterson, Virginia Beach, VA (US); Richard D. Watts, Shrewsbury, MA (US); Keith A. Wells, Angier, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/723,985

(22) Filed: May 28, 2015

(65) Prior Publication Data

US 2016/0103678 A1    Apr. 14, 2016

Related U.S. Application Data

(63) Continuation of application No. 14/510,648, filed on Oct. 9, 2014.

(51) Int. Cl.
*G06F 8/65* (2018.01)
*G06F 8/70* (2018.01)
*G06F 11/36* (2006.01)

(52) U.S. Cl.
CPC .............. *G06F 8/70* (2013.01); *G06F 8/65* (2013.01); *G06F 11/3604* (2013.01); *G06F 11/368* (2013.01); *G06F 11/3672* (2013.01)

(58) Field of Classification Search
CPC .. G06F 8/40; G06F 8/65–8/73; G06F 11/3604
(Continued)

(56) References Cited

U.S. PATENT DOCUMENTS

| | | | |
|---|---|---|---|
| 7,174,348 B1 * | 2/2007 | Sadhu | G06F 8/71 |
| 7,739,083 B2 * | 6/2010 | Naono | G06F 8/41 |
| | | | 318/561 |

(Continued)

OTHER PUBLICATIONS

Definition of "grammar", FOLDOC, 2012, 1 page, [retrieved on Jan. 10, 2018], Retrieved from the Internet: <URL:https://web.archive.org/web/20120305025141/http://foldoc.org/grammar>.*

(Continued)

*Primary Examiner* — Geoffrey St Leger
(74) *Attorney, Agent, or Firm* — Cuenot, Forsythe & Kim, LLC

(57) ABSTRACT

At least one ALM artifact, indexed by a unified data store, that does not comply with at least one process convention can be identified. Responsive to identifying the ALM artifact, indexed by the unified data store, that does not comply with the process convention, a determination can be made by a process convention agent executed by a processor as to whether script code is available to update the ALM artifact to comply with the process convention. Responsive to the process convention agent determining that script code is available to update the ALM artifact to comply with the process convention, the process convention agent can automatically execute the script code to update the ALM artifact to comply with the process convention.

6 Claims, 3 Drawing Sheets

(58) Field of Classification Search
USPC .................. 717/120–126, 136, 168–173
See application file for complete search history.

(56) References Cited

U.S. PATENT DOCUMENTS

| | | | | |
|---|---|---|---|---|
| 7,779,113 | B1* | 8/2010 | Samar | G06F 21/552 707/600 |
| 7,856,575 | B2* | 12/2010 | Bock | G06F 11/079 714/26 |
| 8,205,191 | B1* | 6/2012 | Kolawa | G06F 11/368 717/124 |
| 8,407,670 | B2* | 3/2013 | Hegde | G06F 8/71 717/122 |
| 8,572,593 | B2* | 10/2013 | Vedula | G06F 11/302 717/121 |
| 9,207,932 | B2* | 12/2015 | Clemm | G06F 8/71 |
| 2005/0131937 | A1* | 6/2005 | Parkyn | H04L 41/0654 |
| 2006/0200824 | A1* | 9/2006 | Crane | G06F 9/50 718/100 |
| 2007/0021849 | A1* | 1/2007 | Naono | G06F 8/41 700/37 |
| 2007/0282801 | A1 | 12/2007 | Apte et al. | |
| 2007/0283321 | A1* | 12/2007 | Hegde | G06F 8/71 717/110 |
| 2008/0115123 | A1* | 5/2008 | Kelly | G06F 8/65 717/177 |
| 2009/0037824 | A1* | 2/2009 | Vedula | G06F 11/3051 715/736 |
| 2009/0113248 | A1* | 4/2009 | Bock | G06F 11/0748 714/39 |
| 2010/0010842 | A1* | 1/2010 | Bank | G06F 17/248 707/694 |
| 2010/0017792 | A1 | 1/2010 | Young et al. | |
| 2010/0058114 | A1* | 3/2010 | Perkins | G06Q 10/06 714/39 |
| 2010/0145747 | A1* | 6/2010 | Mayle | G06Q 10/06 707/795 |
| 2011/0260879 | A1* | 10/2011 | Avner | G06F 11/0748 340/679 |
| 2012/0150548 | A1 | 6/2012 | Rajagopalan et al. | |
| 2012/0254823 | A1 | 10/2012 | Coren et al. | |
| 2014/0019806 | A1* | 1/2014 | Kahne | G06F 11/261 714/33 |
| 2014/0053136 | A1* | 2/2014 | Pistoia | G06F 8/75 717/126 |
| 2014/0380267 | A1* | 12/2014 | Fiebig | G06Q 10/06 717/104 |
| 2015/0261507 | A1* | 9/2015 | Bhagavan | G06F 17/30398 717/113 |
| 2015/0347279 | A1* | 12/2015 | Sethu | G06F 11/3684 714/38.1 |
| 2017/0269929 | A1* | 9/2017 | Hegarty | G06F 8/70 |

OTHER PUBLICATIONS

Deutsch, A., et al., Automatic Verification of Data-Centric Business Processes, Proceedings of the 12th International Conference on Database Theory, pp. 252-267, 2009, [retrieved on Jun. 7, 2018], Retrieved from the Internet: <URL:http://dl.acm.org/>.*

Pampino, C., Five imperatives for effective Application Lifecycle Management, IBM Software Thought Leadership White Paper, Dec. 2011, 20 pages, [retrieved on Jun. 7, 2018], Retrieved from the Internet: <URL:http://media.ziffdavisb2bfocus.com/assets/white-paper/five-imperatives-effective-application-lifecycle-management/RAW14267USEN.pdf>.*

IBM: List of IBM Patents or Patent Applications Treated As Related.

Akbulut et al., "Maintaining the Integrity of Process Conventions Within an ALM Framework," U.S. Appl. No. 14/510,648, filed Oct. 9, 2014, 28 pages.

Doherty, L. et al., "Application Lifecycle Management With SCLM on System Z," [online] International Business Machines Corporation, IBM Redbook Form No. SG24-7592-00, Jan. 2009, retrieved from the Internet: <http://www.redbooks.ibm.com/redbooks/pdfs/sg247592.pdf>, 1426 pg.(submitted in 4 segments).

"Collaborative Applicaiton Lifecycle Management with IBM Rational Products," [online] International Business Machines Corporation, IBM Redbook Form No. SG24-7622-00, Dec. 23, 2008, retrieved from the Internet: <http://ip.com/redbook/SG24762200>, 672 pg. (submitted in 3 segments).

* cited by examiner

300

┌─────────────────────────────────────────────────────────────────┐
│ Identify at least one ALM artifact, indexed by a unified data store, that does not │
│ comply with a process convention │
│ 305 │
└─────────────────────────────────────────────────────────────────┘
                                    ↓
┌─────────────────────────────────────────────────────────────────┐
│ Responsive to identifying the ALM artifact indexed by the unified data store that │
│ does not comply with the process convention, determine, by a process │
│ convention agent executed by a processor, whether script code is available to │
│ update the ALM artifact to comply with the process convention │
│ 310 │
└─────────────────────────────────────────────────────────────────┘
                                    ↓
                      ⟨ Is script
                        code available to update the ALM artifact to ⟩ ──No──┐
                        comply with the process convention?
                        315
                                    ↓ Yes                                    │
┌─────────────────────────────────────────────────────────────────┐          │
│ Automatically execute, by the process convention agent, the script code to update │
│ the ALM artifact to comply with the process convention │
│ 320 │
└─────────────────────────────────────────────────────────────────┘          │
                                    ↓ ←──────────────────────────────────────┘
┌─────────────────────────────────────────────────────────────────┐
│ Combine similar process convention violations into a respective group │
│ 325 │
└─────────────────────────────────────────────────────────────────┘
                                    ↓
┌─────────────────────────────────────────────────────────────────┐
│ Identify a user who is an expert at resolving the process convention violations │
│ contained in the group │
│ 330 │
└─────────────────────────────────────────────────────────────────┘
                                    ↓
┌─────────────────────────────────────────────────────────────────┐
│ Route the group of process convention violations to the expert and provide to the │
│ expert a process convention user interface through which the process convention │
│ violations can be corrected │
│ 335 │
└─────────────────────────────────────────────────────────────────┘

FIG. 3

MAINTAINING THE INTEGRITY OF PROCESS CONVENTIONS WITHIN AN ALM FRAMEWORK

CROSS-REFERENCE TO RELATED APPLICATIONS

This application is a Continuation of U.S. application Ser. No. 14/510,648, filed on Oct. 9, 2014, the entirety of which is incorporated herein by reference.

BACKGROUND

The present invention relates to application lifecycle management (ALM).

ALM is a continuous process of managing the life of a software application from concept to delivery. Aspects of ALM include, for example, requirements management, software architecture, computer programming, software testing, software maintenance, change management, continuous integration, project management and release management. Various ALM applications are commercially available to manage these different aspects of ALM. In this regard, it is not uncommon for software development organizations to use multiple ALM applications to manage various facets of software development.

SUMMARY

A method includes identifying at least a first application lifecycle management artifact, indexed by a unified data store, that does not comply with at least a first process convention. The method also includes, responsive to identifying the first application lifecycle management artifact, indexed by the unified data store, that does not comply with the first process convention, determining, by a process convention agent executed by a processor, whether script code is available to update the first application lifecycle management artifact to comply with the first process convention. The method further includes, responsive to the process convention agent determining that script code is available to update the first application lifecycle management artifact to comply with the first process convention, the process convention agent automatically executing the script code to update the first application lifecycle management artifact to comply with the process convention.

BRIEF DESCRIPTION OF THE SEVERAL VIEWS OF THE DRAWINGS

FIG. 3 is a flow chart illustrating an example of a method of maintaining the integrity of process conventions within an application lifecycle management framework.

DETAILED DESCRIPTION

Figure 1:
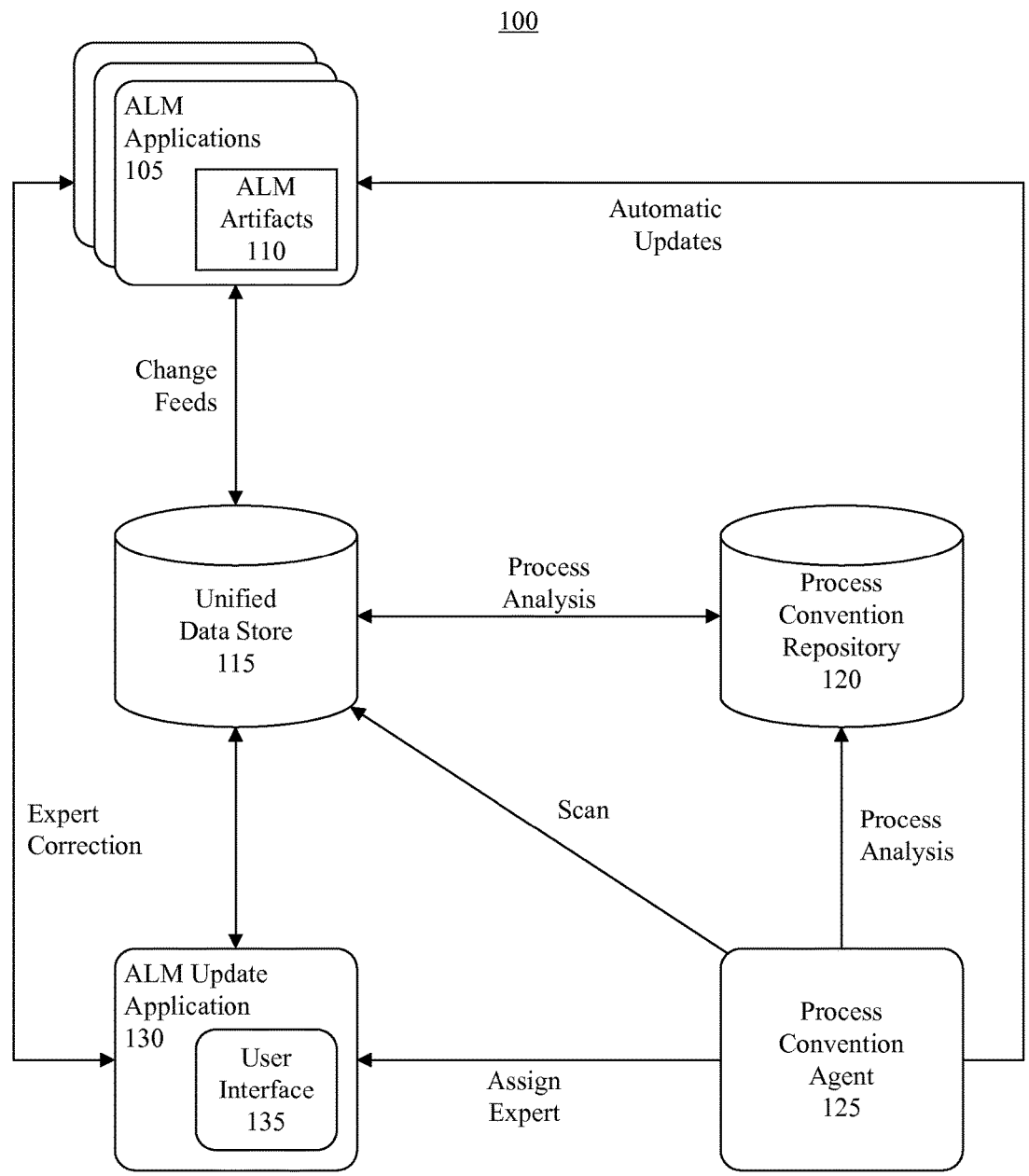
FIG. 1 is a diagram illustrating example components of an application lifecycle management system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to application lifecycle management (ALM) and, more particularly, to maintaining the integrity of process conventions within an ALM framework. In accordance with the inventive arrangements disclosed herein, process conventions can be generated and stored to a process convention repository. Each process convention can be defined for a particular type of ALM artifact. A process convention agent can scan a unified data store, in near real time, to determine whether ALM artifacts indexed therein comply with applicable process conventions. Responsive to identifying an ALM artifact that does not comply with a corresponding process convention, the process convention agent can determine whether script code is available to update the ALM artifact to comply with the process convention. If so, the process convention agent can automatically execute the script code to update the ALM artifact accordingly. If not, the process convention agent can present the ALM artifact in a process convention correction user interface to prompt an expert in that particular type of process convention violation to update the ALM artifact in order to comply with the corresponding process convention.

Several definitions that apply throughout this document now will be presented.

As defined herein, the term "application lifecycle management artifact" (also referred to herein as "ALM artifact") means a tangible by-product produced during development of software and used by one or more lifecycle management applications for lifecycle management of the software. Examples of an application lifecycle management artifact include, but are not limited to, a requirement for software, a test case for software, an identified defect in software, a required unit of work for software (e.g., a "story"), a due date for a unit of work, a progress state of a unit of work, a required milestone, and the like.

As defined herein, the term "application lifecycle management application" (also referred to herein as "ALM application") means program code, executable by a processor, configured to manage application lifecycle management artifacts. An application lifecycle management application can, for example, generate and manage application lifecycle management artifacts for a particular domain, such as requirements management, planning or quality management. An application lifecycle management application may be referred to as an application lifecycle management tool.

As defined herein, the term "application lifecycle management framework" (also referred to herein as "ALM framework") means program code, executable by a processor, configured to provide a computing environment in which a plurality of application lifecycle management applications work together to provide application-wide capabilities. Such capabilities may include, but are not limited to, the ability to create combined views of application lifecycle management artifacts and to create traceability links between application lifecycle management artifacts.

As defined herein, the term "unified data store" means a computer-readable data repository configured to index a plurality of application lifecycle management artifacts generated or updated by a plurality of application lifecycle management applications. For example, a unified data store can index application lifecycle management artifacts generated by a first lifecycle management application, application lifecycle management artifacts generated by a second lifecycle management application, and so on. A unified data store can include, for example, at least one application or service configured to index application lifecycle management artifacts and at least one data table, at least one database, and/or any other data structure(s) suitable for storing parameters, attributes and links of the indexed application lifecycle management artifacts.

As defined herein, the term "index" means an act of storing some or all parameters, attributes and links of an application lifecycle management artifact to facilitate application lifecycle management artifact searches. In this regard, a plurality of application lifecycle artifacts from disparate application lifecycle management systems may be indexed in a manner that enables all of the application lifecycle management artifacts from the disparate lifecycle management systems to be simultaneously searched.

As defined herein, the term "process convention" means a rule defining at least one requirement for a type of application lifecycle management artifact. Examples of such a requirement include, but are not limited to, a required attribute, a required parameter, a required link between the application lifecycle management artifact and another application lifecycle management artifact, and the like.

As defined herein, the term "process convention violation" means an instance of an application lifecycle management artifact not complying with a particular process convention.

As defined herein, the term "process convention repository" means a computer-readable data repository configured to store at least one process convention. A process convention repository can include, for example, at least one data table, at least one database, and/or any other data structure(s) suitable for storing at least one process convention.

As defined herein, the term "process convention agent" means software executable by a processor that maintains the integrity of process conventions within an ALM framework.

As defined herein, the term "script code" means is code written in a programming language that automates execution of tasks in a processing system.

As defined herein, the term "process convention correction user interface" means a user interface presented by a processing system via which a user may create or update application lifecycle management artifact to comply with at least one process convention. In this regard, a "process convention correction user interface" is configured to make the process of creating and updating application lifecycle management artifacts or traceability links to correct a class of convention rule violations quickly and easily for a user who is an expert in particular type of convention rule (such as a test lead, business analyst, etc.).

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "near real time" means periodically implementing a real time process at some interval. By way of example, the interval can be a certain number of seconds, a certain number of minutes, or the like.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

As defined herein, the term "expert" means a user who is an expert at correcting at least one type of process convention violation.

FIG. 1 is a block diagram illustrating an example of an application lifecycle management system (hereinafter "system") 100. Various components of the system 100 can be communicatively linked via one or more communication networks. The communication network(s) is/are the medium used to provide communications links between various devices and data processing systems connected together within the system 100. The communication network(s) may include connections, such as wire, wireless communication links, or fiber optic cables. The communication network(s) can be implemented as, or include, any of a variety of different communication technologies such as a WAN, a LAN, a wireless network, a mobile network, a Virtual Private Network (VPN), the Internet, the Public Switched Telephone Network (PSTN), or the like.

The system 100 can include a plurality of application lifecycle management (ALM) applications 105 executing one or more processing systems. The ALM applications 105 can generate and update ALM artifacts 110 related to lifecycle management of software. For example, users developing and/or managing software being developed and/or maintained can interact with the ALM applications 105 to generate and/or update the ALM artifacts 110. Each ALM application 105 can store respective ALM artifacts 110 to a corresponding data store.

Further, the system 100 can include a unified data store 115 which indexes the ALM artifacts 110 generated by each of the disparate ALM applications 105. For example, each ALM application's data store can be configured to publish ALM artifact change feeds indicating changes to existing ALM artifacts 110 and newly created ALM artifacts. The change feeds can be published in near real time as the ALM artifact 110 changes and/or creations take place. The unified data store 115 can subscribe to such change feeds. Responsive to receiving change feeds, the unified data store 115 can update the indexing of the ALM artifacts 110 accordingly. For example, the unified data store 115 can add, delete or update attributes, parameters and links of ALM artifacts 110 according to the change feeds. In this regard, the unified data store 115 can be a cross-application data store. As such, the unified data store 115 can be a conglomeration of a plurality of data tables and/or databases, though this need not be the case.

Through use of the unified data store 115, the system 100 enables the cross-application use of ALM artifacts 110, as well as linking of ALM artifacts 110 generated using disparate ALM applications 105. In illustration, when a user generates an ALM artifact 110 using a first ALM application 105, the user can create a link between that ALM artifact 110 and another ALM artifact 110 generated using a second ALM application 105. For example, a user generating an ALM artifact 110 that specifies a new feature can link that ALM artifact 110 to an ALM artifact 110 that is a test case which may be used to test program code implementing the new feature, even though the new feature may be specified by an ALM application 105 that is different than the ALM application 105 via which the test case is defined. In this regard, the ALM applications 105 can interface with the unified data store 115 to identify attributes, parameters and/or links of ALM artifacts 110 maintained by other ALM applications 105, thereby allowing links between ALM artifacts 110 of disparate ALM applications 105 to be created, updated and deleted. Accordingly, use of the unified data store 115 can streamline ALM processes, significantly increasing productivity.

The system 100 also can include a process convention repository 120 configured to store process conventions applicable to lifecycle management of software. The process conventions can be generated by one or more users, for example process administrators, who define the process conventions. As noted, each process convention can define at least one requirement for a type of ALM artifact 110. Such requirement can be related to the integrity of the attributes, parameters and links of the ALM artifact 110 or related to required links between the ALM artifact 110 and one or more other ALM artifacts 110. Moreover, such requirement need not be specific to a single ALM application 105. For example, a process convention can specify requirements pertaining to required links between ALM artifacts 110 generated using disparate ALM applications 105.

The system 100 also can include a process convention agent 125 executing on at least one processing system. In one arrangement, in near real time, the process convention agent 125 can scan the unified data store 115 to identify newly added or updated ALM artifacts 110. In illustration, the process convention agent 125 can identify in the unified data store 115 attributes, parameters and/or links of newly added or updated ALM artifacts 110. Newly added or updated ALM artifacts 110 can be identified, for example, based on time/date stamps indicating when the ALM artifacts 110 were created or updated. One or more suitable application programming interfaces (APIs) can be provided to facilitate such scan. Further, the process convention agent 125 can execute one or more queries to access attributes, parameters and/or links of ALM artifacts 110 which are identified in a scan of the unified data store 115. In one aspect, when performing the scan, the process convention agent 125 can identify only those ALM artifacts 110 created or updated since the last scan, though the present arrangements are not limited in this regard. Further, the process convention agent 125 can identify those ALM artifacts 110 to which process conventions that have been created or updated since the last scan are applicable. Accordingly, use of system resources to perform the scan can be minimized. In another arrangement, the unified data store 115 can publish changes indicating newly added or updated ALM artifacts 110, and the process convention agent 125 can subscribe to such changes to identify newly added and/or updated ALM artifacts 110.

Responsive to identifying newly added and/or updated ALM artifacts 110, and/or ALM artifacts 110 potentially affected by process convention changes, the process convention agent 125 can process attributes, parameters and/or links of the identified ALM artifacts 110 published to the unified data store 115 to determine whether such ALM artifacts 110 comply with corresponding process conventions. For example, if an ALM artifact 110 includes each item required by the corresponding process convention, and the required items satisfy the corresponding process convention(s), the process convention agent 125 can identify the ALM artifact 110 as complying with the corresponding process convention(s). Thus, such ALM artifact 110 need not be updated.

If, however, the process convention for a particular ALM artifact 110 indicates that the ALM artifact 110 should include a particular attribute, parameter and/or link and the ALM artifact 110 does not include each of the required items, the process convention agent 125 can identify the ALM artifact 110 as not complying with the corresponding process convention, and thus identify a process convention violation by the artifact 110. Moreover, if each of the required items is present for the ALM artifact 110, but one or more of the required items do not satisfy the corresponding process convention, the process convention agent 125 can identify the ALM artifact 110 as not complying with the corresponding process convention, and thus identify a process convention violation by the artifact 110.

By way of example, if the ALM artifact 110 references a particular test case, and that test case is not indexed by the unified data store 115, the process convention agent 125 can determine that the ALM artifact 110 does not comply with corresponding process convention. In another example, a process convention may require a particular interaction of an ALM artifact 110 across different ALM applications 105. For instance, a process convention that spans requirements, quality and planning management applications might be as follows: "a story must have an 'implements' traceability link to a plan item requirement, and a 'validated by' traceability link to a test case." An ALM artifact 110 which is a story artifact that does not include an "implements" traceability link to a plan item requirement and a "validated by" traceability link to a test case can be identified as not complying with the corresponding process convention. Further, if the ALM artifact 110 includes such traceability links, but one or more of the traceability links are invalid, the ALM artifact 110 can be identified as not complying with the corresponding process convention.

In yet another example, if an ALM artifact 110 pertains to a task, and the ALM artifact 110 is updated to indicate that the task is in progress, an applicable process convention may specify that the ALM artifact 110 should have an owner assigned to the task and a milestone attribute set. Thus, the process convention agent 125 can analyze the ALM artifact 110 to determine whether the ALM artifact 110 does indeed have an owner assigned to the task and a milestone attribute set. If not, the process convention agent 125 can identify the ALM artifact 110 as not complying with the corresponding process convention.

Still, a myriad of other process conventions can be defined, and each ALM artifact 110 can be processed by the process convention agent 125 to identify each process convention applicable to the ALM artifact 110, and verify whether the ALM artifact 110 complies with each of the applicable process conventions. Examples of other process conventions can be rules that require an ALM artifact 110 to include specific attributes, parameters, links or other information, such as a version identifier, a release identifier, a defect identifier, a development requirement, etc.

Responsive to identifying one or more ALM artifacts 110 indexed by the unified data store 115 that do not comply with one or more applicable process conventions, the process convention agent 125 can determine whether script code is available to automatically update the ALM artifacts 110 to comply with the applicable process conventions. By way of example, if an ALM artifact 110 does not include a required link to another ALM artifact 110, script code can update the ALM artifact 110 to create the required link. In illustration, the process convention agent 125 can initiate the scrip code to update ALM artifact 110 maintained by the ALM application 105. For example, if the ALM artifact 110 is stored in a database maintained by the ALM application 105, the script code can execute one or more queries to update the record(s) corresponding to the ALM artifact 110. Responsive to the ALM artifact 110 being updated, the ALM application 105 can publish the change in a change feed to which the unified data store 115 subscribes. The next time the process convention agent 125 scans the unified data store 115, the process convention agent 125 can identify that ALM artifact 110 as being updated, and again determine whether the ALM artifact 110 complies with applicable process conventions.

The system can leverage several well-known statistical and rule based techniques known in the art to determine how to appropriately create required links and/or to correct any other process convention violations. For instance, a statistical model may estimate the correct requirement to link to, by looking at the links of other ALM artifacts that are similar (for example, artifacts whose attributes have same or related values) to artifact 110. If an ALM artifact 110 does not include a required attribute, parameter, link or other information, script code can update the ALM artifact 110 to include the required attribute, parameter, link or other information. The script code can obtain such data in any suitable manner. For example, the script code can access data stored in the system 100 (e.g., in the unified data store 115 or elsewhere in the system 100).

In some cases script code may not be available to update certain ALM artifacts 110, or information required by the script code to perform the updates may not be available. For example, required test cases may not yet exist for some ALM artifacts 110, certain required attributes, parameters, links or other information may not be available, etc. In such cases, the process convention agent 125 can assign experts to update and/or correct the ALM artifacts 110, and prompt the experts to do so. In illustration, if a particular ALM artifact 110 requires a test case that does not exist, the process convention agent 125 can assign an expert to fix this process convention violation, for example by generating the test case and creating a link between the ALM artifact 110 and the test case, or deleting the requirement for a test case from the process convention. As noted, the test case itself is an ALM artifact 110. If a particular ALM artifact 110 is missing a required attribute, parameter, link or other information, the expert can update the ALM artifact 110 with the required data.

The expert can receive notification of required ALM artifact updates via a user interface 135 of a processing system. For example, the process convention agent 125 can send an email, text message, or the like to the expert, which the expert can access via a user interface 135. The notification can include a list of process convention violations to be corrected. In another arrangement, the process convention agent 125 can send the notification to a particular application, such as an ALM update application 130, executing on the processing system, and the ALM update application 130 can present the notification to the expert via the user interface 135. In this arrangement, the user interface 135 can be a component of the ALM update application 130, though this need not be the case. Further, via the ALM update application 130, the process convention agent 125 can present to the expert, in the user interface 135, the ALM artifact 110 to be updated. For example, the user interface 135 can be a process convention user interface. The ALM update application 130 can, responsive to a command received form the process convention agent 125, retrieve the identified ALM artifacts 110 from the ALM applications 105 and present the ALM artifacts 110 in the process convention user interface. Via the user process convention user interface, the expert can update the ALM artifacts 110 to correct the process convention violations. For example, the expert can add required information, create required links, create additional ALM artifacts 110 for which links are required, and so on. In this regard, the ALM update application 105 can interface with the ALM applications 105 to store the updates to the ALM artifacts 110 and store newly created ALM artifacts 110.

Since the process convention agent 125 analyzes the ALM artifacts 110 to determine whether the ALM artifacts 110 comply with applicable process conventions, when ALM artifacts 110 are created or updated the ALM applications 105 need not mandate that users provide non-crucial information for the ALM artifacts 110. For example, users need not be required to answer non-crucial process convention questions. Nonetheless, by implementing the processes described herein, the process convention agent 125 can ensure that any required data and/or links that is missing will be provided at a later time, either via automated scripts or with the help of an expert. This saves time when users are creating and updating ALM artifacts 110. Rather than pausing their work to look for information that may not be readily available to the user, or may be unavailable to the user, users can provide what information they have at hand for the ALM artifacts 110, knowing that the ALM artifacts 110 will be updated with any missing information, either automatically using script code or by experts assigned to the ALM artifacts 110. Moreover, since the automatic fixes and the assignment of experts occurs in near real time, required updates to the ALM artifacts 110 will occur promptly. Further, if a user creates an ALM artifact 110 that requires a test case, and that test case does not yet exist, the process convention agent 125 can ensure that the test case will be generated by a user specializing in generating test cases, and the test case will be linked to the ALM artifact 110.

In one arrangement, when there are multiple ALM artifacts 110 that do not comply with the same or similar process conventions, the process convention agent 125 can group those ALM artifacts 110 and send them to the same expert or group of experts for updates. The ALM artifacts 110 can be, for example, grouped based on the type of process convention violation. In illustration, if there are one hundred process convention violations, and ten of those process convention violations pertain to a missing link to a test case, the ALM artifacts 110 responsible for the missing link violations can be grouped and sent to a person who is an expert at resolving such violations. The process convention agent 125 can include the ALM artifacts 110 in a list that is sent to expert. Since the ALM artifacts 110 grouped, the expert can update the ALM artifacts 110 in a very efficient manner. For example, each of the ALM artifacts 110 in a particular group may be missing a release identifier. The expert may know to which software releases each of the ALM artifacts 110 should be associated. Similarly, each of the ALM artifacts 110 in a particular group may be missing links to test cases. The expert may know which test cases should be linked to each of the ALM artifacts 110, and may know which ALM artifacts 110 require new test cases to be generated. Moreover, in one arrangement, the process convention correction user interface can be configured to allow the expert to update multiple ALM artifacts 110 simultaneously. For example, the expert can select multiple ALM artifacts 110 that are presented and, with a minimal number of user inputs, create links between those ALM artifacts 110 and the corresponding test case(s).

Figure 2:
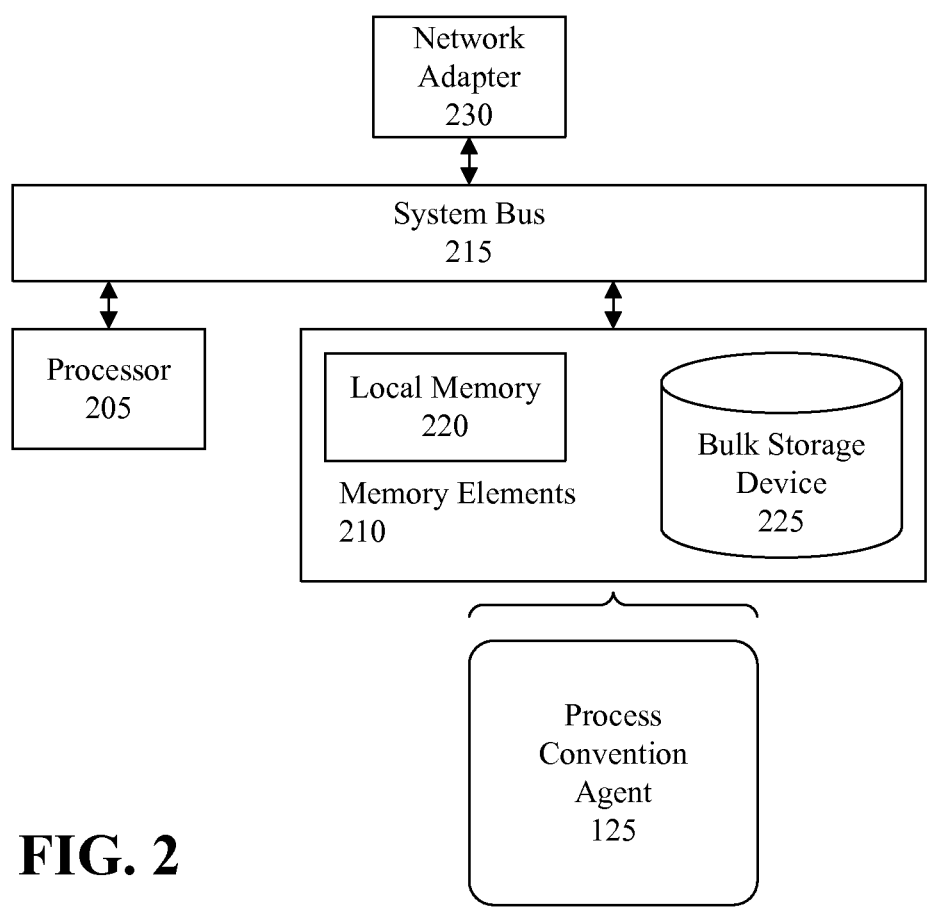
FIG. 2 is a block diagram illustrating example architecture for a data processing system.

FIG. 2 is a block diagram illustrating example architecture for a data processing system 200 configured to execute the process convention agent 125. The processing system 200 can include at least one processor 205 (e.g., a central processing unit) coupled to memory elements 210 through a system bus 215 or other suitable circuitry. As such, the processing system 200 can store program code within the memory elements 210. The processor 205 can execute the program code accessed from the memory elements 210 via the system bus 215. It should be appreciated that the processing system 200 can be implemented in the form of any system including a processor and memory that is capable of performing the functions and/or operations described within this specification. For example, the processing system 200 can be implemented as a computer, such as a server.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The processing system 200 also can include one or more cache memories (not shown) that provide temporary storage of at least some program code in order to reduce the number of times program code must be retrieved from the bulk storage device 225 during execution.

One or more network adapters 230 also can be coupled to processing system 200 to enable the processing system 200 to become coupled to other systems, computer systems and/or remote storage devices through intervening private or public networks. Modems, cable modems, transceivers, and Ethernet cards are examples of different types of network adapters 230 that can be used with the processing system 200.

As pictured in FIG. 2, the memory elements 210 can store the process convention agent 125. Being implemented in the form of executable program code, the process convention agent 125 can be executed by the processing system 200 and, as such, can be considered part of the processing system 200. Moreover, the process convention agent 125, including any ALM artifacts and process conventions processed by the process convention agent 125, are functional data structures that impart functionality when employed as part of the processing system 200.

FIG. 3 is a flow chart illustrating an example of a method 300 of maintaining the integrity of process conventions within an application lifecycle management framework. At step 305, at least one ALM artifact, indexed by a unified data store, that does not comply with a process convention can be identified. At step 310, responsive to identifying the ALM artifact indexed by the unified data store that does not comply with the process convention, a determination can be made, by a process convention agent executed by a processor, whether script code is available to update the ALM artifact to comply with the process convention. Referring to decision box 315, if script code is available to update the ALM artifact to comply with the process convention, at step 320 the process convention agent can automatically execute the script code to update the ALM artifact to comply with the process convention.

If script code is not available to update the ALM artifact to comply with the process convention, at step 325 the process convention agent can combine similar process convention violations into a respective group. At step 330, the process convention agent can identify a user who is an expert at resolving the process convention violations contained in the group. At step 335, the process convention agent can route the group of process convention violations to the expert. For example, the process convention violations can be indicated in a list of process convention violations communicated to the expert. Further, the process convention agent can provide to the expert a process convention user interface through which the process convention violations can be corrected. Specifically, via the process convention user interface, the expert can update the ALM artifacts responsible for the process convention violations in order to make the ALM artifacts comply with the applicable process conventions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    identifying at least a first application lifecycle management artifact, indexed by a unified data store, that does not comply with at least a first process convention, wherein the first process convention is a rule defining at least one requirement for a type of the first application lifecycle management artifact and the first process convention specifies that the first application lifecycle management artifact must be linked to another application lifecycle management artifact, wherein the first application lifecycle management artifact is a test case for software or a required milestone;
    responsive to identifying the first application lifecycle management artifact, indexed by the unified data store, that does not comply with the first process convention, determining, by a process convention agent executed by a processor, whether script code is available to update the first application lifecycle management artifact to comply with the first process convention; and
    responsive to the process convention agent determining that script code is available to update the first application lifecycle management artifact to comply with the first process convention, the process convention agent automatically executing the script code to update the first application lifecycle management artifact to comply with the first process convention and to link the first application lifecycle management artifact to the other application lifecycle management artifact.

2. The method of claim 1, wherein the first application lifecycle management artifact is generated by a first application lifecycle management application and the other application lifecycle management artifact is generated by a second application lifecycle management application.

3. The method of claim 1, wherein:
    the first process convention specifies a required parameter, attribute or link of the first application lifecycle management artifact; and
    automatically executing the script code to update the first application lifecycle management artifact to comply with the first process convention comprises executing the script code to update the first application lifecycle management artifact to include the required parameter, attribute or link.

4. The method of claim 1, wherein the unified data store indexes, in near real time, application lifecycle management artifacts generated by a plurality of disparate application lifecycle management applications.

5. The method of claim 1, further comprising:
    identifying at least a second application lifecycle management artifact, indexed by the unified data store, that does not comply with at least a second process convention;
    responsive to identifying the second application lifecycle management artifact, indexed by the unified data store, that does not comply with the second process convention, determining, by the process convention agent executed by the processor, whether script code is available to update the second application lifecycle management artifact to comply with the second process convention; and
    responsive to the process convention agent determining that script code is not available to update the second application lifecycle management artifact to comply with the second process convention, the process convention agent assigning a user to update the second application lifecycle management artifact to comply with the second process convention.

6. The method of claim 5, wherein the process convention agent prompts the user to create a third application lifecycle management artifact and to link the second application lifecycle management artifact to the third application lifecycle management artifact.

\* \* \* \* \*